2,907,793
PREPARATION OF CYCLOOCTYLAMINE

Louis E. Craig, Pryor, Okla., assignor to General Aniline & Film Corporation, New York, N.Y., a corporation of Delaware No Drawing. Application September 21, 1956
Serial No. 611,349

4 Claims. (Cl. 260—563)

This invention relates to the preparation of cyclooctylamine, and relates more particularly to a novel process for preparing cyclooctylamine by the reduction of α-chlorocyclooctanone oxime with active hydrogen.

The preparation of cyclooctylamine as carried out in accordance with a prior process was slow, involving many steps which may be represented as follows: cyclooctatetraene→cyclooctene→1,2 - epoxycyclooctene→cyclooctanol→cyclooctanone→cyclooctanone oxime→cyclooctylamine. The intermediate, cyclooctene, may be obtained by thermal cyclization of two molecules of butadiene or chloroprene.

I have found that cyclooctylamine may be formed in a simple and expeditious manner by reducing α-chlorocyclooctanone oxime, the preparation of which is described in my application Ser. No. 611,374; filed on even date herewith, with active hydrogen, i.e. nascent hydrogen produced by the action of sodium or sodium amalgam with alcohol or water, or hydrogen activated by a suitable catalyst.

In a preferred method of preparing cyclooctylamine, α-chlorocyclooctanone oxime or a solution thereof as produced by the procedures disclosed in my said application Ser. No. 611,374 is subjected to hydrogenation utilizing a platinum catalyst, or other suitable hydrogenation catalyst, selected from the eighth group of the Periodic Table particularly platinum and palladium as such or their alloys or their oxides, preferably in finely dispersed form, in alcohol or acetic acid at temperatures ranging from room temperature to 100° C. whereby cyclooctylamine is obtained directly.

Cyclooctylamine may also be obtained by reducing α-chlorocyclooctanone oxime using nascent hydrogen produced by sodium and alcohol, sodium amalgam with alcohol or aqueous alcohol, and sodium in liquid ammonia.

It is possible to remove the elements of hydrogen and chlorine from α-chlorocyclooctanone oxime by a preliminary treatment with alcoholic alkali and to hydrogenate the resulting unsaturated oxime, which need not be isolated, to cyclooctylamine. In this case, it is advantageous to treat the solution with Raney nickel to remove catalyst poisons. Hydrogenation catalysts which may be used, other than the platinum oxide mentioned above, may be chosen from Raney nickel, palladium, and the like. Suitable temperatures are from 80° C. to 150° C. with hydrogen pressures of 6 to 20 atmospheres.

Example I

A solution of 87.5 parts of α-chlorocyclooctanone oxime (prepared as in Example I of my said application Ser. No. 611,374) in about 150 parts of 95% ethanol was shaken under hydrogen at 3 atmospheres' pressure at room temperature in the presence of about 2 parts of platinum oxide hydrogenation catalyst. In about 3½ hours, hydrogen absorption had stopped. After removing catalyst by filtration, an excess of hydrochloric acid was added and the ethanol removed by distillation at reduced pressure. The residue was made alkaline with 40% sodium hydroxide and the resulting mixture extracted with ether. The combined ether extracts were dried over anhydrous sodium sulfate and distilled. Cyclooctylamine (60 parts, 95% of theory) was collected at 75–85° C. at about 5 mm. The hydrochloride was prepared by passing a stream of dry hydrogen chloride gas through an ether solution of the amine. After recrystallization from methanol-ether, it decomposed at about 240° C. after darkening around 200° C. (Ruzicka et al. (Helv. Chim. Acta 16, 1339 (1930)) reported a boiling point of 80° C. (10 mm.) for cyclooctylamine and a melting point of 244–245 C. for the hydrochloride.) The following analytical results were obtained on the hydrochloride: Found: C, 58.40%; H, 11.18%; N, 8.55%. Calculated for $C_8H_{18}ClN$: C, 58.70%; H, 11.08%; N, 8.56%.

Example II

A solution of α-chlorocyclooctanone oxime in tetrahydrofuran was prepared as in Example II of my said application Ser. No. 611,374 by addition of 23 parts of nitrosyl chloride in tetrahydrofuran to 33 parts of cyclooctene in tetrahydrofuran. To this solution diluted with 200 parts of ethanol was added 29 parts of sodium in small pieces. A gentle reflux was maintained by controlling the rate of addition. After all of the sodium had been added, reflux was maintained another two hours until all traces of sodium had reacted. 550 parts of water were added and enough hydrochloric acid added to make the water layer acid. The organic layer was separated and the water layer extracted with ether to remove non-basic organic materials. The water layer was then made basic with 40% sodium hydroxide and extracted with ether. The ether extracts were worked up in the manner described in Example I to give cyclooctylamine, boiling point 94–96° C. (22 mm.). Cyclooctylurea, prepared by dissolving a 2 g. sample of this product in an equivalent amount of dilute hydrochloric acid, adding about 2 g. of potassium cyanate, and heating for 2 hours on a steam bath, melted at 176–178° C. Ruzicka et al. (Helv. Chim. Acta 16, 1339 (1930)) reported melting point of 179–180° C. for cyclooctylurea.

Example III

To a solution of 30 parts of potassium hydroxide in 300 parts of ethanol was added 87 parts of α-chlorocyclooctanone oxime. An exothermic reaction occurred and a white solid separated. The mixture was heated at reflux for one hour, cooled, and the solid collected by filtration. The solid, potassium chloride, amounted to 36 g. (theory=38 g.). About 5 parts of Raney nickel was added to the filtrate, the mixture stirred at reflux for one hour, cooled, and filtered. The filtrate was then placed in an Aminco bomb and shaken under hydrogen at 100 p.s.i.g. at 100° C. in the presence of about 5 parts of Raney nickel catalyst until no more hydrogen was absorbed. Cyclooctylamine was isolated in 80% yield by the manner described in Example I.

Example IV

The procedure of Example III was followed through the treatment of the solution with Raney nickel followed by filtration. To this filtrate was added 100 parts of acetic acid and hydrogenation carried out under the same conditions except that Adams platinum oxide catalyst (1 part) was used instead of Raney nickel as catalyst.

Example V

A solution of α-chlorocyclooctanone oxime in ethanol, prepared as in my said application Ser. No. 611,374, by adding 16 parts of nitrosyl chloride to 22 parts of cyclooctene in 50 parts of absolute ethanol. The resulting light green solution is treated with a solution of 12 parts of potassium hydroxide in 100 parts of ethanol. After heating at reflux for one hour, cooling, and removing the precipitated potassium chloride, the filtrate was treated with Raney nickel and hydrogenated as in Example III to give cyclooctylamine, boiling point 74–80° C. (5 mm.).

It will thus be seen starting with the $\alpha$-chlorocyclooctanone oxime of my said application Ser. No. 611,374, my process is much more expeditious than the process heretofore employed for the preparation of cyclooctylamine. It is a great improvement over the prior process even when considered as starting with the same compound, i.e. cyclooctatetraene, in which case the steps involved may be represented as follows: cyclooctatetraene→cyclooctene→$\alpha$-chlorocyclooctanone oxime→cyclooctylamine.

It is to be understood that the foregoing detailed description is given merely by way of illustration and that many variations may be made therein without departing from the spirit of my invention.

Having described my invention what I desire to secure by Letters Patent is:

1. Process for the preparation of cyclooctylamine directly from $\alpha$-chlorocyclooctanone oxime, said process consisting essentially of the step of subjecting a solution of $\alpha$-chlorocyclooctanone oxime in a solvent, selected from the group consisting of ethanol and tetrahydrofuran, to the action of hydrogen in the presence of a hydrogenation catalyst, selected from the group consisting of platinum, palladium, and alloys and oxides thereof, and Raney nickel, at a temperature between room temperature and 150° C. and a hydrogen pressure of from 6 to 20 atmospheres.

2. Process in accordance with claim 1, wherein the $\alpha$-chlorocyclooctanone oxime is first treated with alcoholic alkali.

3. Process in accordance with claim 1, wherein nascent hydrogen is employed.

4. Process for the preparation of cyclooctylamine directly from $\alpha$-chlorooctyloctanone oxime, said process consisting essentially of the step of subjecting a solution of $\alpha$-chlorocyclooctanone oxime in 95% ethanol to the action of hydrogen in the presence of platinum oxide at room temperature and a hydrogen pressure of 3 atmospheres.

References Cited in the file of this patent

UNITED STATES PATENTS 2,371,418   Beckham et al. _____ Mar. 13, 1945

OTHER REFERENCES

Ruzicka et al.: 28 Chem. Abst. 1990 (1934).